United States Patent
Porter et al.

(10) Patent No.: US 9,172,612 B2
(45) Date of Patent: Oct. 27, 2015

(54) NETWORK DEVICE CONFIGURATION MANAGEMENT BY PHYSICAL LOCATION

(75) Inventors: Richard H. Porter, Roseville, CA (US); Gregory D. Dolkas, Roseville, CA (US); Mark W. Fidler, Roseville, CA (US)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 405 days.

(21) Appl. No.: 12/370,355

(22) Filed: Feb. 12, 2009

(65) Prior Publication Data

US 2010/0205281 A1    Aug. 12, 2010

(51) Int. Cl.
*G06F 15/177* (2006.01)
*H04L 12/24* (2006.01)

(52) U.S. Cl.
CPC ............ *H04L 41/12* (2013.01); *H04L 41/0853* (2013.01); *H04L 41/0213* (2013.01); *Y02B 60/43* (2013.01)

(58) Field of Classification Search
USPC .................................. 709/220, 222, 223, 244
See application file for complete search history.

(56) References Cited

U.S. PATENT DOCUMENTS

| | | |
|---|---|---|
| 5,838,907 A | 11/1998 | Hansen |
| 7,150,037 B2 | 12/2006 | Wolf et al. |
| 7,269,653 B2 | 9/2007 | Mentze et al. |
| 7,363,260 B1 | 4/2008 | Stamler et al. |
| 7,430,181 B1 | 9/2008 | Hong |
| 7,437,545 B2 | 10/2008 | Haustein et al. |
| 7,444,320 B1 | 10/2008 | Bakke et al. |
| 7,467,372 B2 | 12/2008 | Loughlin et al. |
| 2009/0093248 A1* | 4/2009 | Srinivasan .................... 455/433 |
| 2009/0256683 A1* | 10/2009 | Stephenson et al. ......... 340/10.1 |
| 2010/0093340 A1* | 4/2010 | Buracchini ................ 455/426.1 |
| 2010/0180016 A1* | 7/2010 | Bugwadia et al. ............ 709/220 |
| 2010/0278076 A1* | 11/2010 | Reddy et al. .................. 370/254 |

\* cited by examiner

*Primary Examiner* — Lan-Dai T Truong
(74) *Attorney, Agent, or Firm* — Dicke, Billig & Czaja, PLLC (57) ABSTRACT

A method of managing a network including maintaining a database of network configuration profiles, each network configuration profile corresponding to a network device type and a physical location relative to the network, determining with a network device a physical location of the network device relative to the network upon the network device being initially connected to the network, the network device being of a network device type, and determining a network configuration profile with which to configure the network device from the database based on the physical location and the network device type of the network device.

15 Claims, 4 Drawing Sheets

NETWORK DEVICE CONFIGURATION MANAGEMENT BY PHYSICAL LOCATION

BACKGROUND

Broadly speaking, a computer network consists of a collection of network devices, including network end-points or nodes devices such as personal computers and servers, for example, which are linked via an interconnect structure consisting of any number of network infrastructure devices such as, for example, routers, switches, hubs, and wireless access points. Initially, network devices are not configured to meet any specific requirements or purpose prior to being installed into a particular computer network. Configuration is a process of setting or selecting the operating or configuration parameters of network devices, such as network operating protocols and security keys, for example, so that the network device is able to properly connect to, operate on or provide connectivity within the network. Because of the wide variety of network devices, as well as the variety of networks which may be connected to form internetworks, the configuration process can be a difficult task requiring detailed knowledge of the various networks and, the protocols used to link the various networks, and the multitude of network devices installed thereon, and often one of the most daunting facing network administrators.

Even after initial configuration is complete, network administrators responsible for managing large networks, such as in a campus setting, for example, frequently have to add or replace network devices that attach to the network, either as end-point devices or network infrastructure devices that form part of the network infrastructure itself. Such additional network devices and replacement devices are typically configured to provide services tailored to their specific locations on the network (e.g. an engineering building on a campus), with replacement devices typically configured to operate exactly the same as the failed devices they replace. In either case, individually configuring such devices is resource intensive and prone to human error, particularly with regard to large scale deployments, such as outfitting a network in a new building, which might require that hundreds of devices be configured.

In attempts to simplify the configuration process, network configuration management tools have been developed for configuring network devices remotely coupled to a network. Such configuration management tools typically manage device configurations based on individual device serial numbers or network MAC (Media Access Control) addresses and not based on a location of the device relative to the network, such as a point of connection to the network. As a result, conventional configuration management tools configure network devices, be they added devices or replacement devices, with only generic or default configurations since the replacement device is identified via its MAC address or serial number, which while indicative of the type of device, is not indicative of its location on the network.

For these and other reasons, a need exists for the present invention.

DETAILED DESCRIPTION

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments described herein provide a system and techniques for automatically configuring network devices connected to a network based on a physical locations of the network devices relative to the network, such as a point of connection to the network or a physical location of the network device (e.g. a geographic location), for example.

Figure 1:
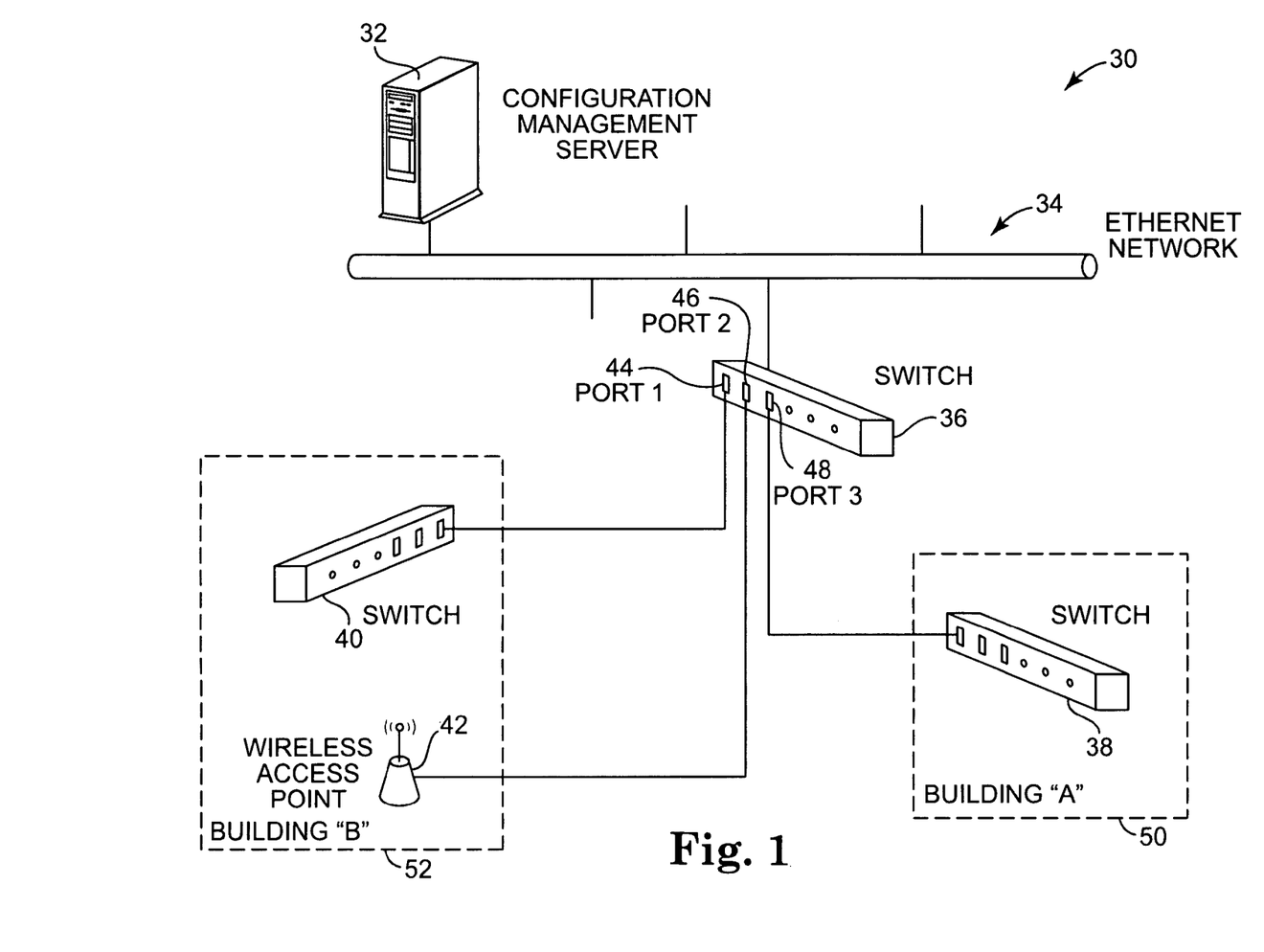
FIG. 1 is a block and schematic diagram generally illustrating an example of a portion of a network employing network configuration techniques according to embodiments described herein.

FIG. 1 is block and schematic diagram generally illustrating an example of a portion of a network 30 employing network configuration techniques according to embodiments described herein. Network 30, as illustrated, includes a configuration management server 32, an Ethernet network 34, switches 36, 38, and 40, and a wireless access point 42. Switch 36 has a plurality of ports, including a first port 44, a second port 46, and a third port 48, with switch 40 connected to first port 44, wireless access point 42 connected to second port 46, and switch 38 coupled to third port 48. According to one embodiment, network 30 is a campus-type network with switch 38 located within a Building A, 50, and switch 40 and wireless access point 42 located within a Building B, 52, with configuration management server 32 and switch 34 being located remotely there from.

As described in greater detail below, according to one embodiment configuration management server 32 configures network devices replacing existing network devices or additional network device added to network 30 based on information provided by the network device itself which is representative of the physical location of the network device with respect to network 30, such as a point of connection to network 30 or a physical or geographic position relative to network 30, for example. A "network device", as described herein, includes any device connected to a network, including network infrastructure devices, which form the network or interconnect structure itself (e.g. routers, switches, and wireless access points), and network endpoints or nodes (e.g. personal computers and servers).

Figure 2:
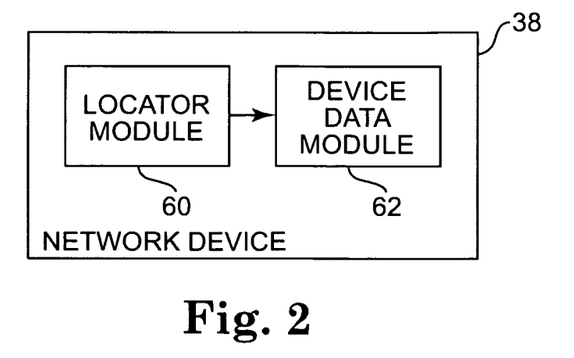
FIG. 2 is a block diagram generally illustrating a network device, according to one embodiment.

FIG. 2 is block diagram generally illustrating a network device, such as switch 38 of FIG. 1 (i.e. a network infrastructure device), according to one embodiment. According to the embodiment of FIG. 2, switch 38 includes a locator module 60 and a device data module 62. According to one embodiment, upon initial power-up of switch 38 after connection to a network, such as network 60, locator module 60 is configured to determine the location of the network device, in this case, switch 38, relative to network 30.

According to one embodiment, locator module 60 employs a network protocol to interrogate network 30 to determine the physical point of connection of switch 38 to network 30. According to one embodiment, locator module 60 employs a vendor-neutral protocol, such as Link-Layer Discovery Protocol (LLDP). For example, according to such an embodiment, with reference to FIG. 1, upon initial power-up of switch 38, locator module 60 communicates with network 30 using a protocol, such as LLDP, for example, and determines that switch 38 is connected to the third port 48 (Port 3) of switch 36. Locator module 60 then writes the point of connection information of switch 38 to device data module 62. According to one embodiment, device data module 62 comprises a Management Information Base (MIB) module which, in addition to the location information provided by locator module 62, includes other data/information representative of the identity and characteristics of the network device (e.g. manufacturer serial number, MAC address).

Locator module 60 may be configured to determine the physical location of switch 38 using other techniques as well. For example, according to one embodiment, in lieu of communicating with network 30 to determine a point of connection thereto, locator module 60 includes a global positioning system (GPS) which determines the geographic coordinates of switch 38. Locator module 60 then stores the geographic coordinates in device data module 62.

According to one embodiment, locator module 60 includes a radio frequency identification (RFID) sensor to detect the presence of an RFID tag located at a known location relative to network 30, such as Building A 50, for example, or a particular location within Building A 50. According to one embodiment, locator module 60 employs triangulation of wireless radio signals broadcast by wireless access points or other radio-wave transmitting devices, for example, to determine the geographic location of the network device.

Additionally, although described above primarily with respect to switch 38, it is noted that locator module 60 and device data module 62 may be applied to any type of network device, including network infrastructure devices such as switches, wireless access points, and routers, for example.

Figure 3:
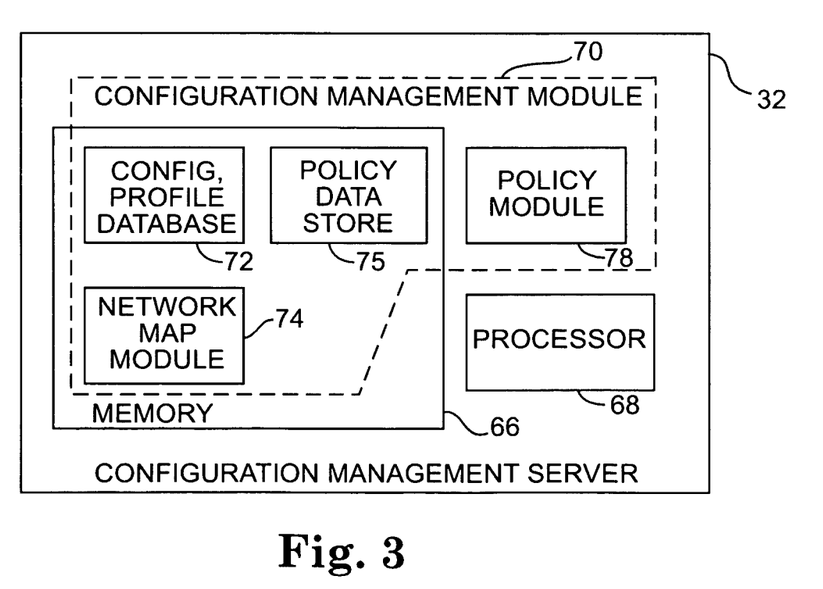
FIG. 3 is a block diagram generally illustrating configuration management server, according to one embodiment.

FIG. 3 is a block diagram generally illustrating configuration management server 32, according to one embodiment. According to the embodiment of FIG. 3, configuration management server 32 includes a memory 66, a processor 68, and a configuration management module 70, with configuration management module further including a configuration profile database 72, a network map module 74, a policy data store 75, and a policy module 76.

Configuration profile database 72 includes a plurality of network configuration profiles to be employed for various types of network devices on network 30, each network configuration profile including information required for the corresponding network device to properly connect to and operate on network 30, including software images, license keys, and various settings and operating parameters. According to one embodiment, configuration profile database 72 includes a specific network configuration profile for each existing network device connected to network 30, including a location reference indicating the location of the network device on network 30. According to one embodiment, the location reference indicates the point of connection of the network device to network 30.

According to one embodiment, configuration profile database 72 includes a default network configuration profile for each type of network device connected to, or which may be connected to, network 30. According to one embodiment, configuration profile database 72 includes a default network configuration profile for each type of network device for each of a plurality of locations on network 30, such as Buildings A, 50, and B, 52, for example.

Network map module 74 includes a database of information representative of a physical layout of network 30. According to one embodiment, network map module 74 includes a database representative of network device locations. For example, with reference to FIG. 1, network map module 74 includes data indicating that switch 38 is located in Building A, 50, and that switch 40 and wireless access point 52 are located in Building B, 52. According to one embodiment, network map module 74 includes data representative of a geographic disposition of network 30, such as a range of GPS coordinates associated with different locations served by network 30, such as Buildings A and B, 50 and 52, for example, and various network devices or networks structures, for example. According to one embodiment, network map module 74 includes data representing the locations of RFID tags relative to network 30. For example, with reference to FIG. 1, network map module 74 includes data indicating that a particular RFID tag is located in Building A 50 (or even a particular location within Building A 50), and that another RFID tag is location in Building B 52, for example.

Policy module 74 includes guidelines or configuration rules to determine which network configuration profile, if any, of the various network configuration profiles of configuration profile database 72 network configuration management module 70 is to provide to a new or replacement network device being connected to network 30 based on device and location data obtained from device data module 62 of the network device. It is noted that the plurality of network configuration profiles of configuration profile database 72 are initially created by a network administrator(s) and can be both manually and automatically updated thereafter. According to one embodiment, the configuration rules reside in policy data store 75 and, as described below, are operated on by policy module 76 to determine a network configuration profile to be provided to a network device which is newly connected to network 30.

According to one embodiment, as illustrated by FIG. 3, configuration profile database 72, network map module 74, and policy data store 75 reside in memory 66 of configuration management server 32. In one embodiment, policy module 78 also resides in memory 66. According to other embodiments, as illustrated, policy module 78 is implemented in hardware, software, firmware, or any combination thereof, separate from memory 66 and processor 68. For example, policy module 68 may be implemented as an application specific integrated circuit (ASIC).

As will be described in greater detail below, during operation of network 30, configuration management module 70 is configured to carry out a monitoring procedure or monitoring cycle on a regular basis to determine whether any new network devices have been connected to or whether any existing network devices have been disconnected from network 30. According to one embodiment, configuration management module 70 communicates with existing and newly added network devices according to a protocol, such as Simple Network Management Protocol, for example.

The operation of configuration management module 70 of network 30 and network devices connected thereto, such as switch 38 and wireless access point 42, is described below by various example scenarios. In a first scenario, consider that switch 38 in Building A 50 has been connected to network 30 via third port 48 of switch 36 so as to replace a nearly identical switch in Building A 50 which was formerly connected to third port 48 of switch 36. Upon initial power-up of switch 38 after being connected to network 60, locator module 60 employs a network protocol, such as LLDP, for example, to interrogate network 30 and determines that switch 38 is connected to third port 48 of switch 36. Locator module 60 then stores the location information in device data module 62.

Configuration Management Server 32, via configuration management module 70, determines as part of its next monitoring cycle that switch 38 is connected to network 30. Configuration management module 70 then reads the information stored in device data module 62 of switch 38, including the point of connection information determined by locator module 60 and information indicating the type of network device which, in this scenario, is a switch. According to one embodiment, configuration management module 70 reads the information from switch 38 using a known protocol, such as Simple Network Management Protocol, for example.

Policy module 76 employs the data obtained from device data module 62 of switch 38 to determine which, if any, of the network configuration profiles from configuration profile database 72 to provide to switch 38 for configuration. According to one embodiment, policy module 76 searches configuration profile database 72 to determine whether there is an existing network configuration profile associated with third port 48 of switch 36. If policy module 76 finds such a profile, it next determines with the existing network configuration profile associated with third port 48 of switch 36 is for a switch. According to one embodiment, and according to this scenario, if the existing network configuration profile was also for a switch, policy module 76 provides the existing network configuration profile to switch 38 so as to configure switch 38 in exactly the same fashion as the network switch that switch 38 is replacing.

In a second scenario, assume that wireless access point 42 is replacing an existing switch (not illustrated) in Building B 52 that was formerly connected to second port 48 of switch 36. Similar to that described above with respect to switch 38, upon initial power-up of wireless access point 42 after being connected to network 30, a locator module of wireless access point 42 (similar to locator module 60 of switch 38) interrogates network 30 and determines that wireless access point 42 is connected to second port 46 of switch 36. This point of connection information is then stored in a device data module of wireless access point 42 (similar to device data module 62 of switch 38).

In a fashion similar to that described above, configuration Management Server 32, via configuration management module 70, determines as part of its next monitoring cycle that wireless access point 42 is connected to network 30. Configuration management module 70 then reads the information stored in the device data module of wireless access point 42 (e.g. the point-of-connection data and device type data).

Policy module 76 then employs the data obtained from the device data module of wireless access point 42 to determine which, if any, of the network configuration profiles from configuration profile database 72 to provide to wireless access point 42 for configuration. According to one embodiment, policy module 76 searches configuration profile database 72 to determine whether there is an existing network configuration profile associated with second port 46 of switch 36. If policy module 76 finds such a profile, it next determines with the existing network configuration profile associated with second port 46 of switch 36 is for a wireless access point. According to the present scenario, the existing network configuration profile was for a switch, while the new network device is a wireless access point.

Next, according to one embodiment, policy module 76 then searches network map module 74 and determines that third port 46 of switch 36 is assigned to Building B 52 and, in response, provides wireless access point 42 with a network configuration profile from configuration profile database 72 that is a default configuration for any wireless access point located in Building B 52. It is noted that if the network configuration profile of wireless access point 42 is later edited from the default configuration (so as to be tailored specifically to the network requirements of its particular location within Building B 52, for example), configuration management module 70 will update the configuration profile of wireless access point 42 (connected to second port 46 of switch 36) at its next monitoring cycle.

According to one embodiment, in lieu of providing wireless access point 42 with a default network configuration profile, upon determining that the existing network configuration profile is for a switch and that the device newly connected to second port 46 of switch 36 is now a wireless access point, policy module 76 does not provide wireless access point 42 with a network configuration profile, but notifies the network administrator for manual intervention.

In a third scenario, assume that switch 38 is newly added to Building A 50 (i.e. it is not replacing any network device). Upon initial power-up of switch 38 after being connected to network 30, locator module 60, in lieu of employing LLDP to determine its point of connection to network 30, employs a GPS receiver to determine the geographic coordinates (e.g. latitude, longitude, and elevation) of switch 38. The geographic coordinates are then stored in data module 62. During its next network monitoring cycle, Configuration Management Server 32 determines that switch 38 is connected to network 30, and configuration management module 70 reads the information stored in device data module 62 of switch 38 (e.g. the point-of-connection data and device type data).

Policy module 76 then employs the data obtained from device data module 62 to determine which, if any, of the network configuration profiles of configuration profile database 72 to provide to switch 38 for configuration. According to one embodiment, policy module 76 searches network map module 74 and determines that the geographic coordinates of switch 38 fall within a range of geographic coordinates for Building A 50. In response, according to one embodiment, policy module 76 provides switch 38 with a network configuration profile from configuration profile database 72 that is a default configuration for any switch located in Building A 50. Again, it is noted that if the network configuration profile of switch 38 is later edited from the default configuration (so as to be tailored specifically to the network requirements of its particular location within Building A 50, for example), configuration management module 70 will update the configuration profile of switch 38 at its next monitoring cycle.

It is noted that the three scenarios described above are only some of the many possible scenarios that may be addressed by configuration management module 70, and that any number of different "policies" or "configuration rules", not explicitly described herein, may be employed by policy module 76 to determine which, if any, of the network configuration profiles of configuration profile database 72 will be provided to network devices newly connected to network 30. For example, one general configuration rule may state that "any wireless access point in Building B 52 will be provided with a certain default network configuration profile", while a more specific rule may state that "any Model Z wireless access point connected to any port of switch 36 will be provided with 'network configuration profile Y' from configuration profile database 72." A "configuration action" may also be associated with such configuration rules. For example, a configuration action associated with the above described configuration rule for the Model Z wireless access point may define the creation of two SSIDs (Service Set Identifiers), one for "Guests" and one for "Employees", with Guest traffic assigned to VLAN1, no security, and Employee traffic assigned to VLAN2, WPA2 security, encryption key 12345678, and all other parameters assigned from default network configuration profile Y.

Figure 4:
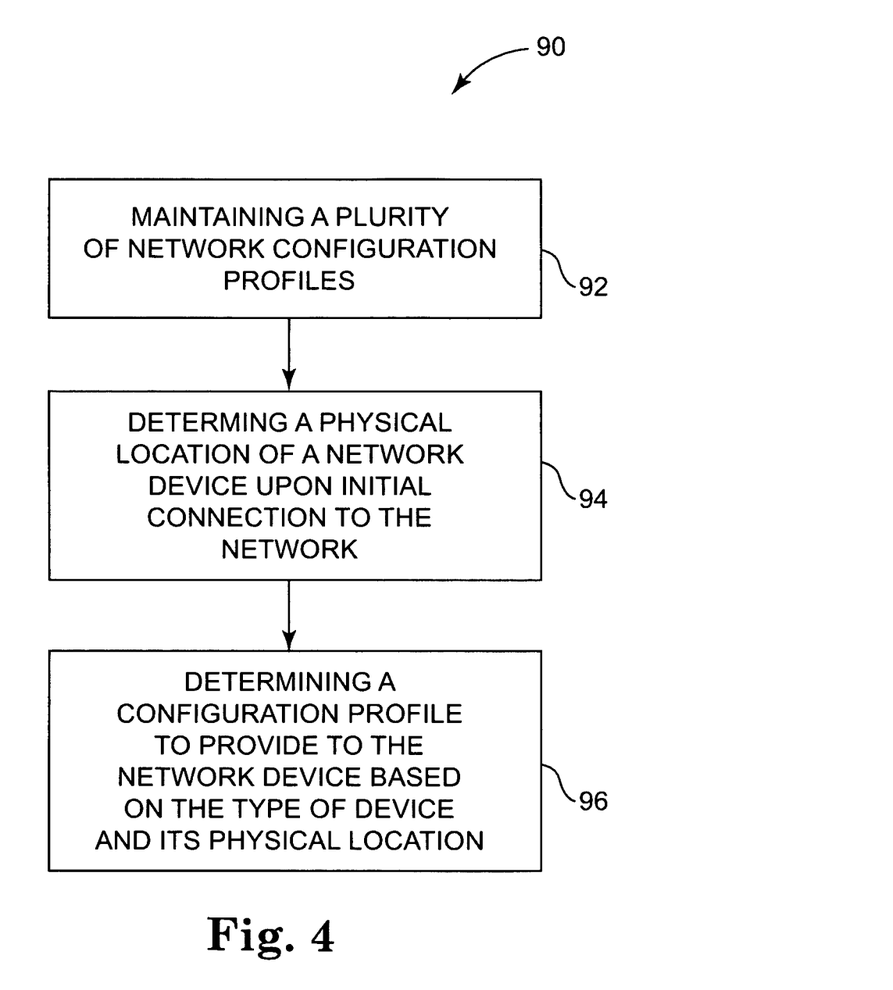
FIG. 4 is a flow diagram generally illustrating a method of managing a computer network, according to one embodiment.

FIG. 4 is a flow diagram generally illustrating a process 90 for configuring network devices according to embodiments described herein. As illustrated, process 90 begins at 92 with creating and maintaining a plurality of network configuration profiles for various types of network devices, with each network configuration profile corresponding to a network device type and a physical location point relative to the network.

At 94, process 90 determines a physical location of a network device upon the network device being initially connected to the network, the network device being of a network device type. According to one embodiment, determining the physical location includes the network device determining the point of connection to the network by communicating with the network via a vendor neutral protocol, such as LLDP, for example. According to one embodiment, determining the physical location includes determining a geographic location by obtaining geographic coordinates via a global positioning system receiver integral to the network device.

At 96, process 90 determines a network configuration profile from the plurality of network configuration profiles with which to configure the network device based on the physical location and the network device type of the network device. According to one embodiment, determining a network configuration profile includes manual intervention by a network administrator.

Figure 5:
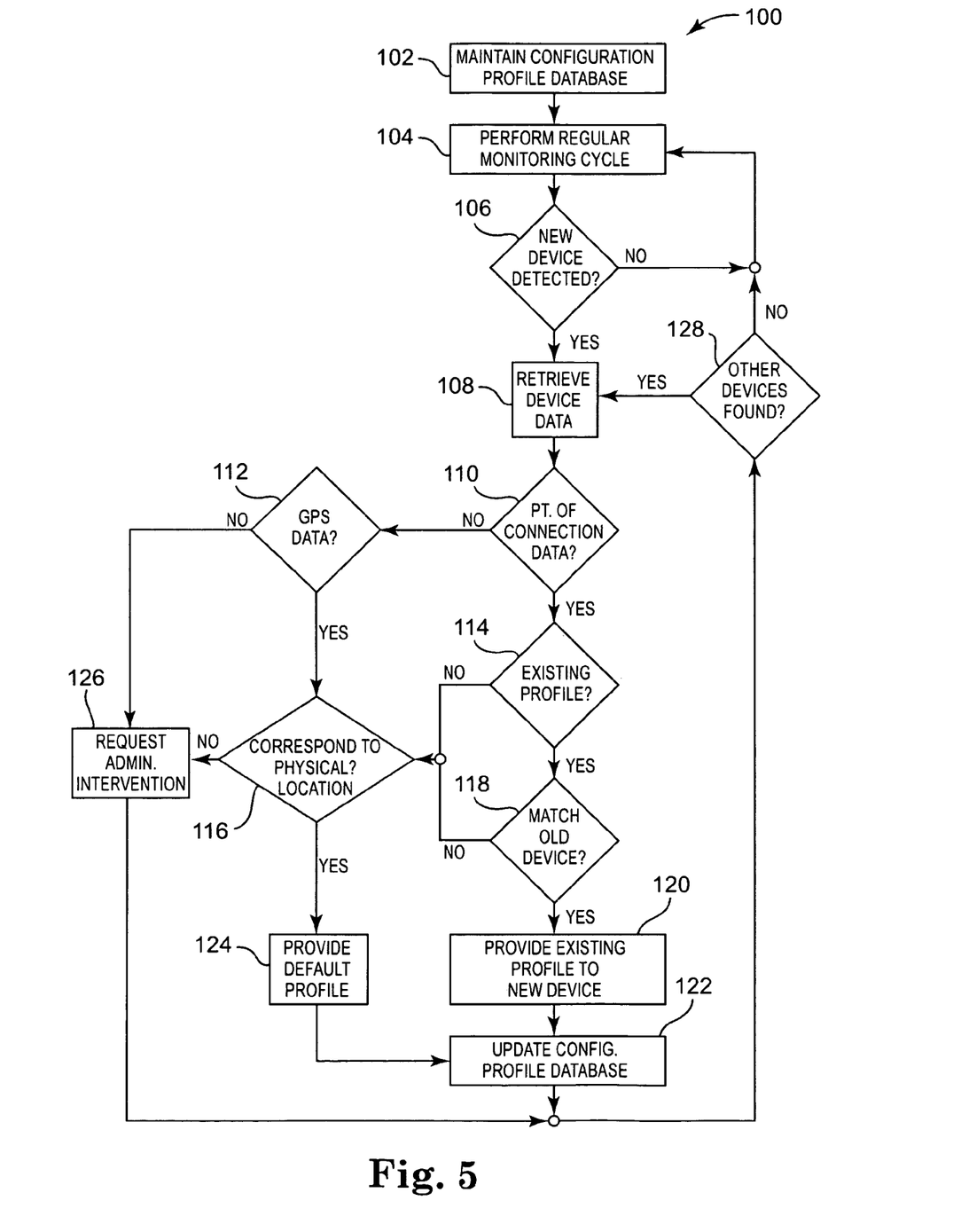
FIG. 5 is a flow diagram illustrating a process for configuring network devices according to one embodiment.

FIG. 5, with further reference to FIGS. 1 through 3, is a flow diagram generally illustrating a process 100 for configuring network devices of network 30 according to embodiments described herein. Process 100 begins at 102 with the creation and maintenance of a database of network configuration profiles for various network devices, such as described above with respect to configuration profile database 72 of configuration management module 70. Process 100 proceeds to 104 where configuration management module 70 performs a monitoring cycle on a regular basis to detect whether new network devices have been connected to network 30. At 106, process 100 queries whether any new devices have been detected. If the answer to the query at 106 is "no", process 100 returns to 104 to perform the next regularly scheduled network monitoring cycle.

If the answer to the query at 106 is "yes", process 100 proceeds to 108 where configuration management module retrieves the location and device type data (and other data) from the device data module of the newly detected network device, such as from device data module 62 of switch 38, as described above. At 110, configuration management module 70 determines whether the location data retrieved from the newly detected network device is representative of a point-of-connection to the network, such as a switch port (e.g. first port 44 of switch 38). If the answer to the query at 110 is "no", process 100 proceeds to 112.

If the answer to the query at 110 is "yes", process 100 proceeds to 114 where configuration management module 70 queries whether there is an existing network configuration profile associated with the point-of-connection of the newly detected network device. According to one embodiment, policy module 76 queries configuration profile database 72 to determine whether there is an existing network configuration profile stored therein which corresponds to the point-of-connection of the of the newly detected network device. If there is no such network configuration profile in configuration profile database 72, process 100 proceeds to 116.

If there is an existing network configuration profile stored in configuration profile database 72 which corresponds to the point-of-connection of the of the newly detected network device, process 100 proceeds to 118, where process 100 queries whether the associated network device type matches that of the newly detected network device (e.g. switches or routers, for example?). If the answer to the query at 118 is "no", meaning that the network device types do not match, process 100 proceeds to 116.

If the answer to the query at 118 is "yes", meaning that the network device types are the same (both are network switches, for example) process 100 proceeds to 120. At 120, policy module 76 deems the newly detected network device to be a replacement device and provides the existing network configuration profile corresponding to the point-of-connection to the newly detected network device for configuration thereof. Process 120 then proceeds to 122, wherein the network configuration profile associated with the point-of-connection of the newly detected device in configuration profile database 72 is updated with the device data of the newly detected device.

As described above, if the answer to the query at 110 is "no", process 100 proceeds to 112 where it is queried whether the location data retrieved from the device data module, such as device data module 62 of switch 38, is GPS coordinate data. If the answer to the query at 112 is "yes", process 100 proceeds to 116 where configuration management module 70 queries whether the location data received from the newly detected devices corresponds to a known physical location of relative to network 30. For example, if the location data is GPS coordinate data, configuration management module 70 references network map module 74 to determine whether the GPS coordinate data corresponds to any geographic coordinate data associated with network 30, such as a range of geographic coordinates corresponding to Building A 50, for example. If the location data is representative of a point-of-connection to network 30, configuration management module 70 references network map module 74 to determine whether the point-of-connection corresponds to a physical location associated with network 30, again, such as Building A 50, for example.

If the answer to the query at 116 is "yes", meaning that the location data corresponds to a physical location associated with network 30 (e.g. a point-of-connector or a geographic location), process 100 proceeds to 124 where policy module 76 determines a default network configuration profile associated with the physical location stored in configuration profile database 72, and provides the default network configuration profile, or a modified version thereof based on configuration rules associated therewith, to the newly detected network device. Process 100 then proceeds to 122 where, as described above, the configuration profile database 72 is updated with network configuration of the newly detected data for the corresponding physical location.

If the answer to the query at either 112 or 116 is "no", meaning that the location data is representative of neither a point-of-connection to network 30 or of a physical location associated with network 30, process 100 proceeds to 126, where a network administrator is notified and requested to intervene.

After updating configuration profile database 72 at 122 and after requesting intervention of a network administrator at 126, process 100 proceeds to 128, where it queries whether other network devices have been found to be newly connected to network 30. If the answer to the query at 128 is "yes", process 100 proceeds to 108 where the network configuration process of 108 to 126 is repeated for a next newly connected network device. If the answer to the query at 128 is "no", process 100 returns to 104 to perform the next regularly scheduled network monitoring cycle.

It is noted that process 100, as illustrated by FIG. 5, represents only one example of a network configuration management process based on the physical location of network devices, and that any number of other processes may be employed in accordance with embodiments described herein.

By managing network devices based on physical locations relative to the network according to embodiments described herein, new and replacement network devices can be automatically configured immediately upon attachment to a network, thereby reducing efforts required by network administrators. Additionally, the occurrence of incorrect device configuration due to human error is reduced as are security risks associated with devices that utilize predictable default configurations upon initial connection and power-up of the device.

Furthermore, managing network device configuration according to embodiments herein enables network devices to be automatically configured and tailored to meet the needs specific to the particular physical location. For example, switch 38 would be automatically configured based on the specific requirements of Building A 50 (e.g. an engineering building) when installed in Building A 50, and automatically configured based on the specific requirements of Building B 52 (e.g. a library) when installed in Building B 52. As such, even if switch 38 was initially installed in Building A 50, according to present embodiments, switch 38 would be automatically reconfigured to the specific requirements of Building B 52 if switch 38 was later removed from Building A 50 and installed in Building B 52. However, conventional configuration management techniques, which are based on identifiers specific to the network device (e.g. MAC address, manufacturer's serial number) would configure switch 38 in the same fashion regardless of whether switch 38 is installed in Building A 50 or Building B 52 because switch 38 is identified only as a switch and is not associated with a particular location on the network.

It will be understood by a person of ordinary skill in the art that functions performed by configuration management module 70 and policy module 76 and locator and device data modules 60 and 62 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory, and random access memory.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A method of managing a computer network, the method comprising:
maintaining a database of network configuration profiles, each network configuration profile corresponding to a network device type and a physical location relative to the network;
upon connecting a network infrastructure device to the computer network, the network infrastructure device being of a network device type, determining with the network infrastructure device a physical location of the network infrastructure device relative to the network, the network infrastructure device internally storing its physical location and network device type information; and
upon detecting the network infrastructure device on the computer network, a management configuration server accessing the physical location and network device type information from the network infrastructure device and providing a network configuration profile to the network infrastructure device from the database based on the physical location and the network device type information;
upon receiving the network configuration profile, the network infrastructure device configuring itself for operation on the computer network.

2. The method of claim 1, wherein determining a physical location includes determining a physical point of connection of the infrastructure device to the network.

3. The method of claim 2, including the network infrastructure device communicating with the network using a vendor neutral protocol to determine its point of connection to the network.

4. The method of claim 3, wherein the vendor neutral protocol comprises Link-Layer Discovery Protocol (LLDP).

5. The method of claim 1, wherein determining a physical location includes determining geographic location of the network infrastructure device.

6. The method of claim 5, wherein the geographic location comprises coordinates obtained using a global positioning system receiver integral to the network infrastructure device.

7. The method of claim 5, wherein the geographic location comprises coordinates obtained using triangulation of radio signals from wireless access points or other radio-wave transmitting devices.

8. The method of claim 5, wherein the geographic location comprises using a Radio Frequency Identification (RFID) receiver integral to the network infrastructure device to identify the presence of an RFID tag disposed at a known location relative to the network.

9. A network infrastructure device comprising:
a physical interconnect to physically connect to a point of connection to a network;
a device data module including, stored therein, data indicative of the network device type of which the network infrastructure device consists; and
a locator module, upon initial connection of the network infrastructure device to the network, configured to determine a physical location of the network infrastructure device relative to the network by communicating with the network and determining the physical point of connection to the network, and to store data representative of the determined physical location in the device data module, the device data module to be accessed by the network upon detection of the network infrastructure device by the network, and the network infrastructure device to receive a configuration profile from the network based on the determined physical location and network device type.

10. The network infrastructure device of claim 9, wherein the device data module comprises a management information base (MIB).

11. The network infrastructure device of claim 9, wherein the locator module is configured to communicate with the network using a vendor-neutral protocol.

12. The network infrastructure device of claim 11, wherein the vendor-neutral protocol comprises Link-Layer Discovery Protocol (LLDP).

13. The network infrastructure device of claim 9, wherein the locator module includes a Radio Frequency Identification (RFID) receiver to identify the presence of an RFID tag disposed at a known location relative to the network.

14. The network infrastructure device of claim 9, wherein the network infrastructure device comprises a device selected from a group consisting of a switch, a router, a hub, a wireless access point, a gateway device, a bridge, a repeater, a firewall, a multiplexer, a modem, a line driver, a bridge router, a multilayer switch, and a protocol converter.

15. The network infrastructure device of claim 9, wherein the physical interconnect comprises a port.

* * * * *